United States Patent [19]
Yuh et al.

[11] Patent Number: 6,159,627
[45] Date of Patent: Dec. 12, 2000

[54] BIPOLAR SEPARATOR FOR USE IN A FUEL CELL ASSEMBLY

[75] Inventors: Chao-Yi Yuh, New Milford; Michael Primerano, Torrington; Mohammad Farooque, Huntington, all of Conn.

[73] Assignee: Energy Research Corporation, Danbury, Conn.

[21] Appl. No.: 09/135,737

[22] Filed: Aug. 18, 1998

[51] Int. Cl.[7] .................................................. H01M 2/00
[52] U.S. Cl. .................................. 429/34; 429/36; 429/38
[58] Field of Search .................................. 429/34, 35, 36, 429/38, 41

[56] References Cited

U.S. PATENT DOCUMENTS 5,773,161   6/1998   Farooque et al. ..................... 429/34

*Primary Examiner*—Maria Nuzzolillo
*Assistant Examiner*—Monique Wills
*Attorney, Agent, or Firm*—Robin, Blecker & Daley

[57] ABSTRACT

A bipolar separator formed from a plate having trough members formed on opposing first and second sides of a central area. Separately formed trough members are secured to opposing third and fourth sides of the central area. The trough members and trough areas are formed so as to reduce stress on the electrolyte matrices supported thereby.

9 Claims, 6 Drawing Sheets

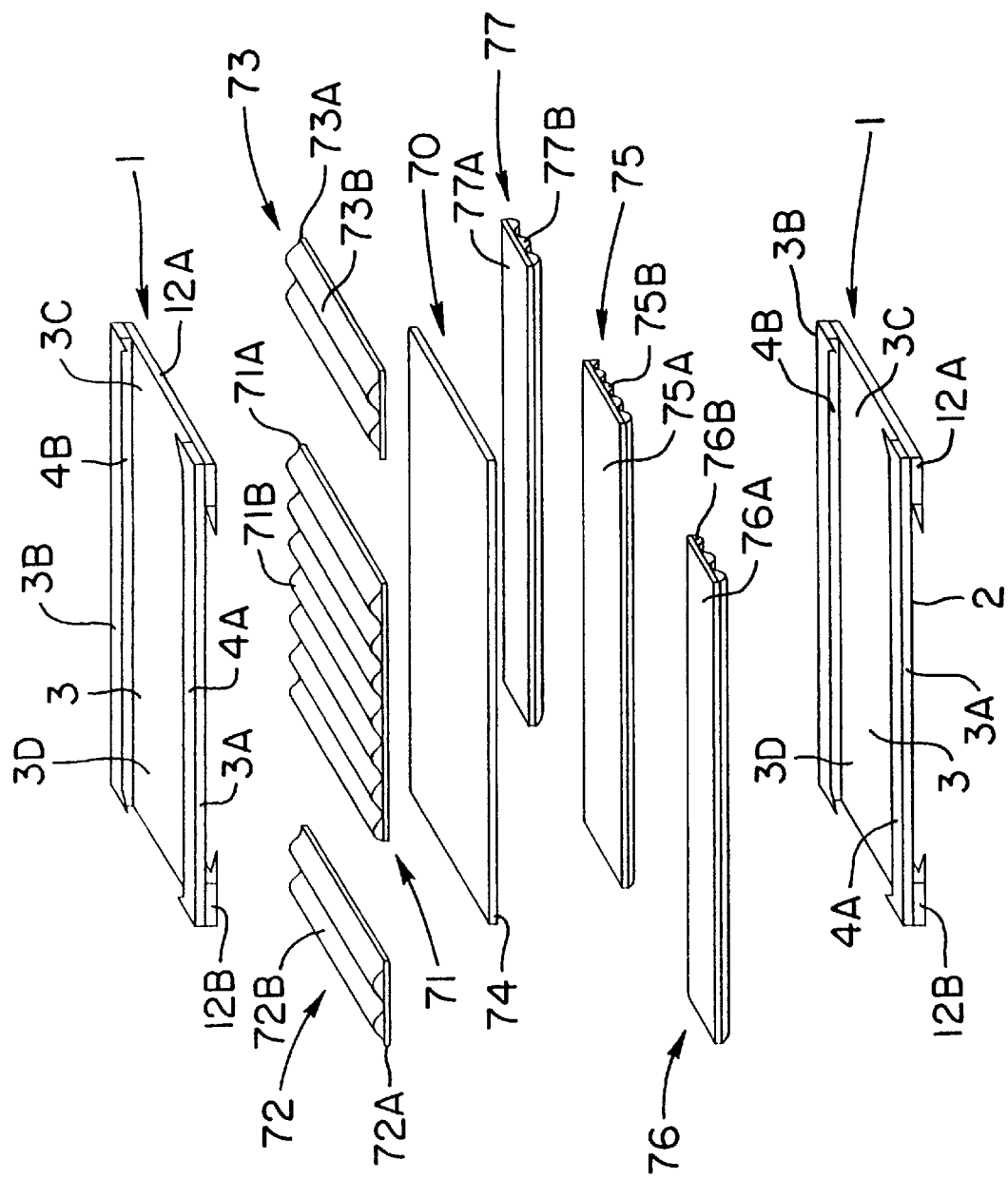

BIPOLAR SEPARATOR FOR USE IN A FUEL CELL ASSEMBLY

BACKGROUND OF THE INVENTION

This invention relates to a bipolar separator and, in particular, to a bipolar separator used in a fuel cell assembly.

In U.S. patent application Ser. No. 08/725,286, filed Oct. 2, 1996, assigned to the same assignee hereof, there is disclosed a bipolar separator which can be more simply and efficiently manufactured. As a result, the cost of the separator and, therefore, the fuel cell assembly, can be reduced.

More particularly, the bipolar separator of the '286 application comprises a clad of nickel and stainless steel formed as a plate in which troughs are provided into the nickel surface of the plate on the four sides of the plate. One set of opposing troughs is bent up and around so that the stainless steel surface faces outwardly to form a first set of opposing side rails. The second set of opposing troughs already have their stainless steel surfaces facing outwardly and form a second set of opposing side rails. The sets of side rails support electrolyte matrices when the separator plate is used to separate adjacent fuel cells of a fuel cell stack.

By forming the bipolar separator with troughs, the bending procedure is greatly simplified, as compared to the prior procedure used for earlier designs. This prior procedure required eight bending steps and an etching step to remove the outer facing nickel clad of one of the sets of side rails.

However, the bipolar separator of the '286 application also has certain disadvantages. Thus, each trough of the separator at the point of initial contact with the supported electrolyte matrix has an abrupt change in direction where the vertical and horizontal walls of the trough meet. This abrupt change creates a stress area which can cause cracks in the supported matrix. Cracks in the matrix, in turn, can result in cross-flow of the hydrogen and oxygen gases in the fuel cell assemblies, thereby seriously deteriorating fuel cell performance.

It is, therefore, an object of the present invention to provide a bipolar separator which does not suffer from the above disadvantages.

It is a further object of the present invention to provide a bipolar separator which has side rails configured to have reduced stress producing areas.

SUMMARY OF THE INVENTION

In accordance with the principles of the present invention, the above and other objects are realized in a bipolar separator formed from a plate having opposing first and second surfaces compatible with fuel and oxidant gases, respectively. Trough areas are integrally formed into the first surface of the plate on first and second opposing sides of a central area of the plate. The trough areas are bent over and around so that the first surface of each trough area faces the first surface of the central area and the second surface of each trough area faces outwardly.

Trough members having first and second surfaces compatible with the oxidant gas are separately formed from the plate. The trough members are secured to opposing third and fourth sides of the central area so that the first surface of each trough member faces the second surface of the central area and the second surface of each trough member faces outwardly.

Each trough area and each trough member is formed to have a base member and first, second and third side walls. The first side wall is at an angle to and connects the base member to the respective side of the central area of the plate. The second and third side walls are connected to opposing sides of the first side wall and to opposing sides of the base member. Each trough area and each trough member is open opposite the first side wall.

With the bipolar separator formed as aforesaid, the trough areas and trough members act as rails for the electrolyte matrices when the plate is used with adjacent fuel cell assemblies. However, due to the trough areas and trough members now being open opposite their first sides, there is no abrupt change over their extents at the points of initial contact with the respective matrix. As a result, the stress placed on the matrix is reduced, thereby minimizing the likelihood of cracking.

DETAILED DESCRIPTION OF THE DRAWINGS

The above and other features and aspects of the present invention will become more apparent upon reading the following detailed description in conjunction with the accompanying drawings, in which FIGS. 1, 2 and 3 illustrate a bipolar separator in accordance with the principles of the present invention;

FIGS. 5 and 6 show different welding techniques for forming the separator of FIGS. 1–3 and FIG. 7 shows the separator of FIGS. 1 to 3 incorporated into a fuel cell assembly.

DETAILED DESCRIPTION

Figure 1:
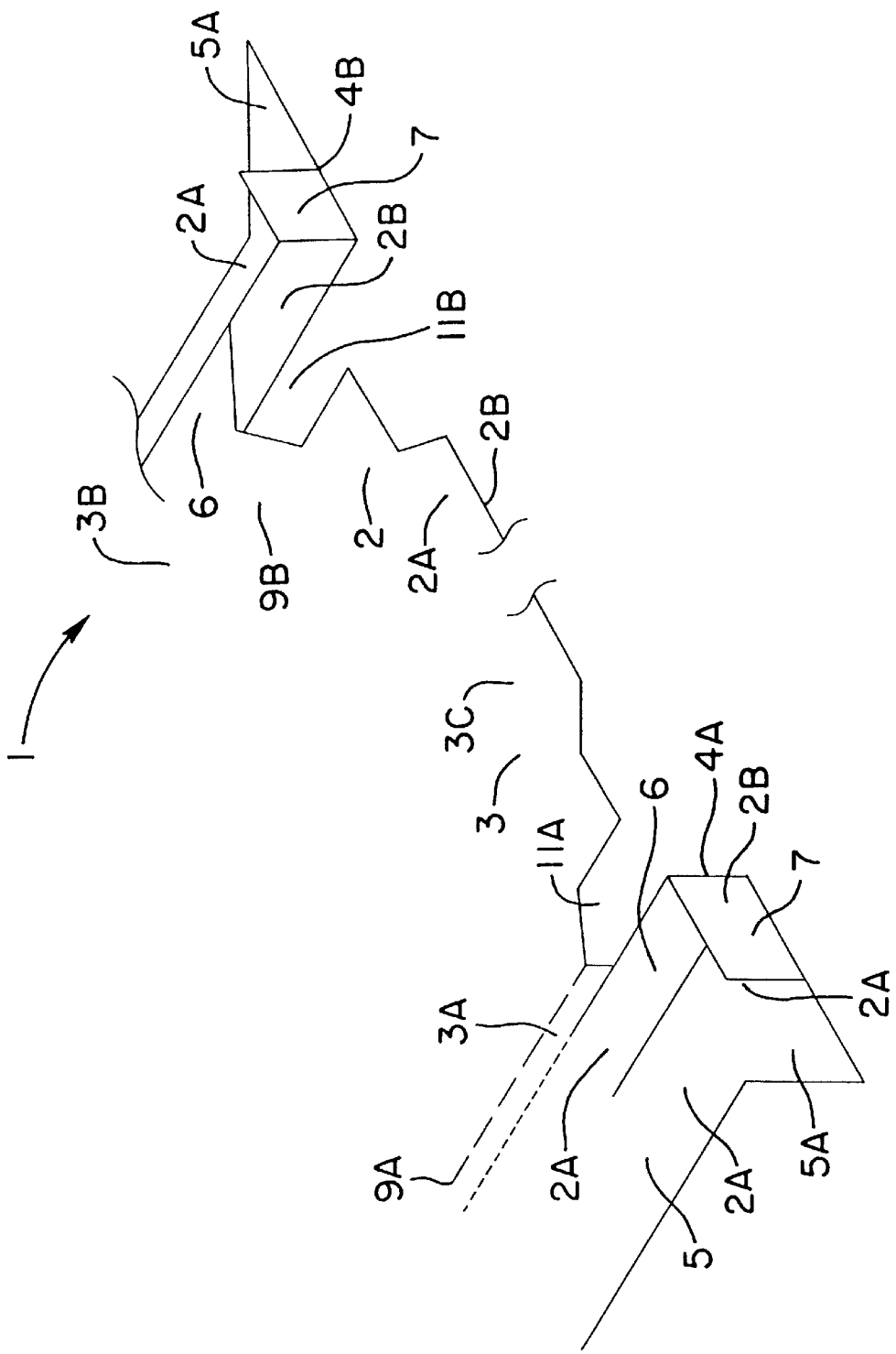
Figure 2:
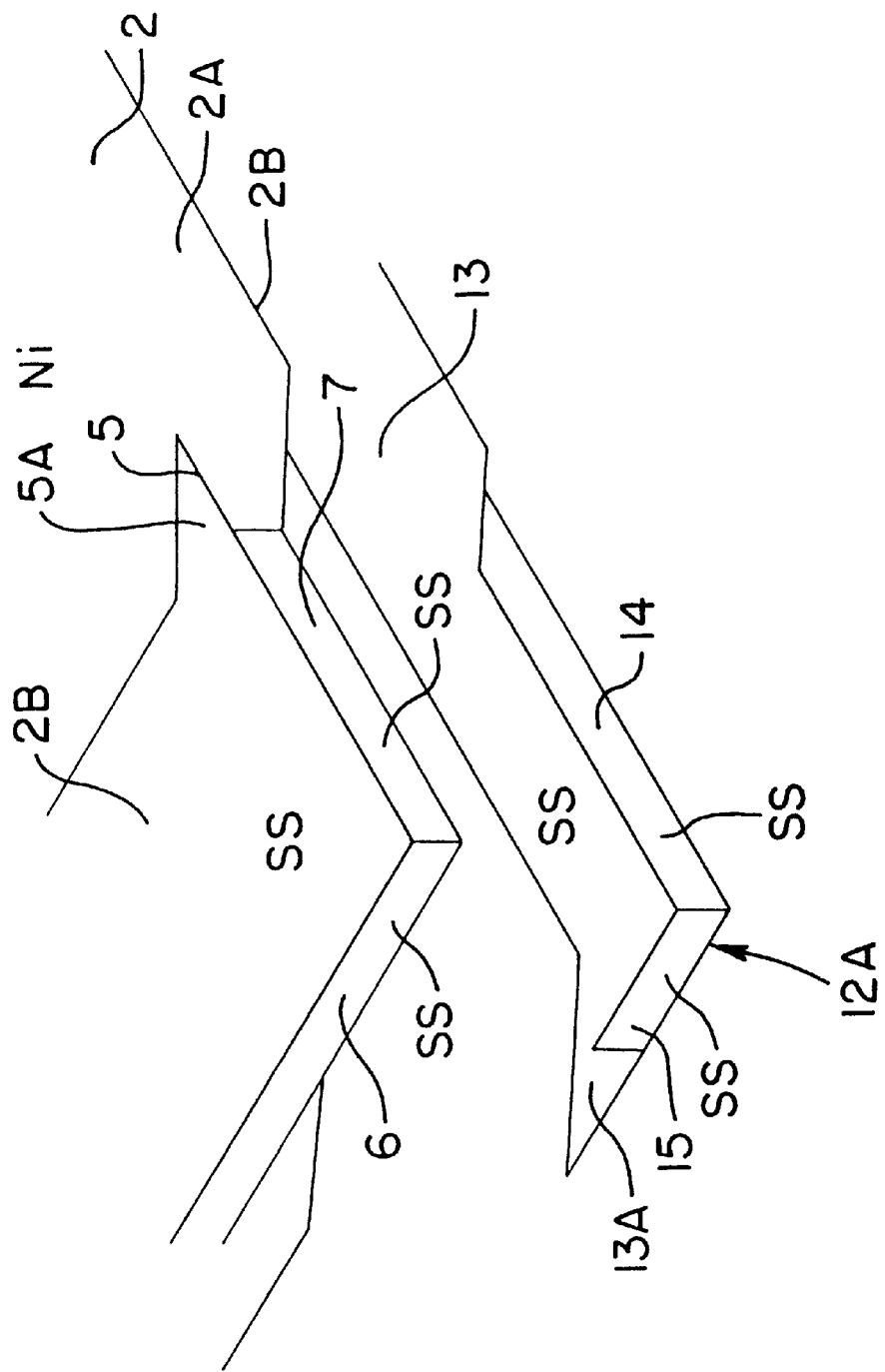
Figure 3:
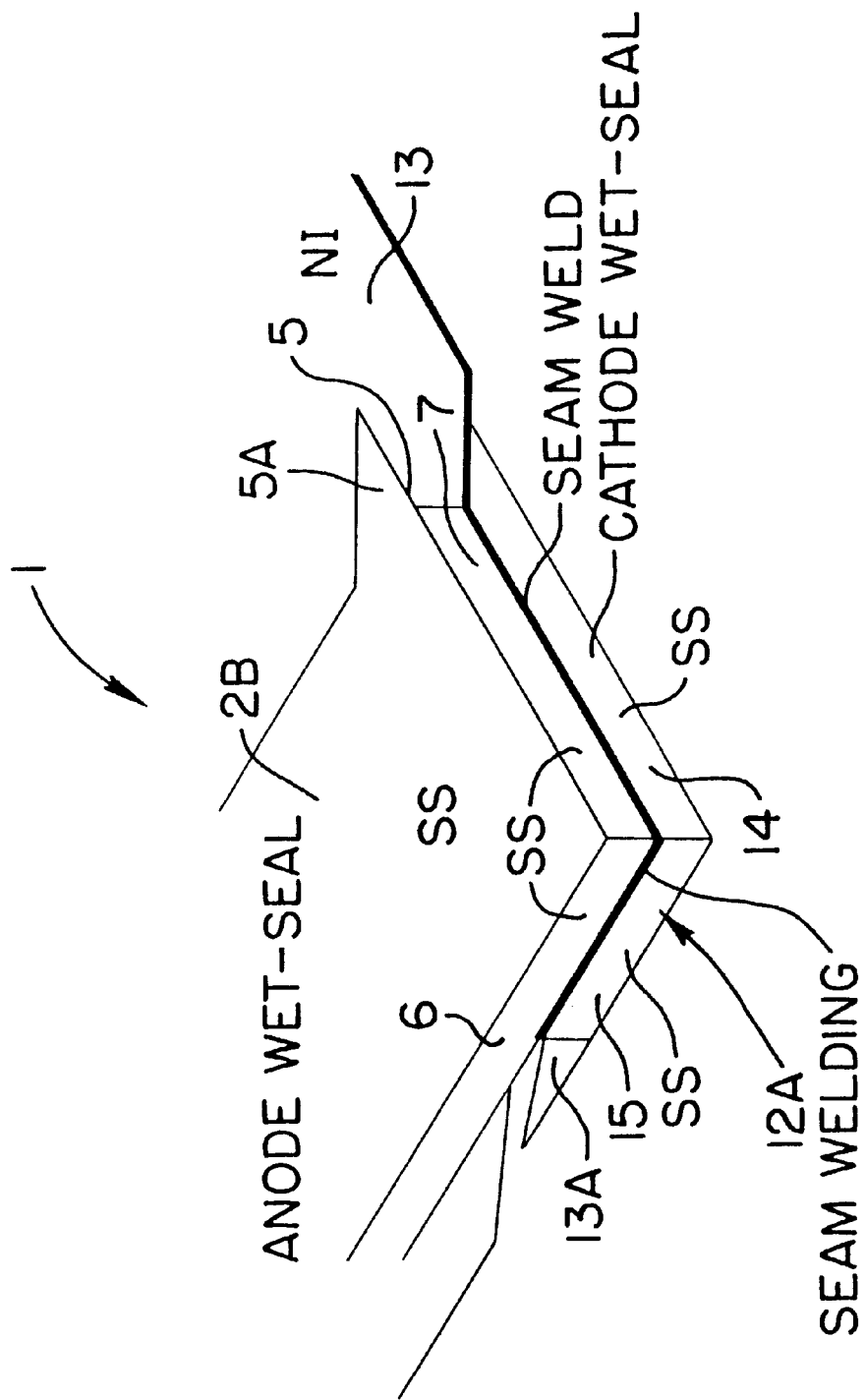

FIGS. 1–3 show a bipolar separator 1 in accordance with the principles of the present invention. As shown, the separator 1 comprises a plate 2 having first and second surfaces 2A and 2B. The first surface 2A is compatible with a fuel gas (e.g., a hydrogen) environment and the second surface 2B is compatible with an oxidant gas environment. Typically, the plate 2 can be formed from stainless steel, which is compatible with oxidant gas, and which is provided on one surface with a laminate or cladding, such as nickel, which is compatible with fuel gas to form the first surface.

As can be seen, the plate 2 includes a central area 3 having first and second opposing sides 3A and 3B and third and fourth opposing sides 3C and 3D. Extending from each of the opposing sides 3A and 3B is a trough or box-like region formed into the first surface 2A of the plate. The surface 2A thus defines the extent of one surface of the central area and the extents of the inner surfaces of the trough areas 4A–4B.

As shown, the trough areas 4A and 4B each comprise a base member 5 and first, second and third side walls 6, 7 and 8 (not shown). The side wall 6 connects the base member 5 to the central area 3 of the plate 2 and it is at an angle relative to this area. The side walls 7 and 8 connect to opposite sides of the base member 5 and to opposite sides of the side wall 6. The base member 5 includes extension parts or lips 5A, 5B (not shown) which extend beyond the side walls 7 and 8. The trough areas 4A and 4B are open opposite the side wall 6.

As shown from FIGS. 1 and 2, the trough areas 4A and 4B are also bent over and around along fold lines 9A and 9B at sides 3A and 3B of the central area 3. Cutouts 11A and 11B in the central area 3 facilitate bending of the trough areas. This bending causes the first surfaces 2A of the trough areas 4A and 4B to face the first surface 2A of the central area and the second surfaces 2B of the trough areas to face outwardly.

As shown, the separator 1 further comprises trough members 12A and 12B formed separately from the plate 2. These trough members have first and second surfaces compatible with oxidant gas and each comprises a base member 13 and first, second and third side walls 14, 15 and 16 (not shown). The side walls 15 and 16 connect to opposing sides of the first side wall 14 and to opposing sides of the base member 13. Each base member 13 includes extensions or lips 13A, 13B which extend beyond the side walls 15 and 16. The trough members 12A and 12B are further open opposite their first side walls.

The trough members 12A and 12B are secured to the opposite sides 3C and 3D of the central area 3 of the plate 2. More particularly, the upper ends of the side walls 14, 15 and 16 of each trough member contact the second surface 2B of the plate on the respective side of the plate. As shown in FIG. 3, along this contact area the trough side walls and plate surface are joined together or secured as, for example, by seam welding. With the trough members so secured to the plate 2, the second surface of each trough member faces the second surface of the central area and the first surface of each trough member faces outwardly.

The bipolar separator 1 can be used as a separator plate between adjacent fuel cell assemblies in a fuel cell stack. In such case, the trough areas 4A and 4B form rails which result in wet seals for the electrolyte matrix on the anode element side of one of the adjacent fuel cell assemblies. The trough members 12A and 12B, in turn, form rails which result in wet seals for the matrix on the cathode element side of the adjacent fuel cell assemblies.

Due to the manner of forming the separator 1, all the surfaces of the rails exposed to the outside air environment are parts of a second surface, i.e., are stainless steel, and, therefore, oxidant gas compatible. As a result, corrosion resistance of the wet seal areas is maintained without the need to remove any nickel clad from the separator.

Figure 4:
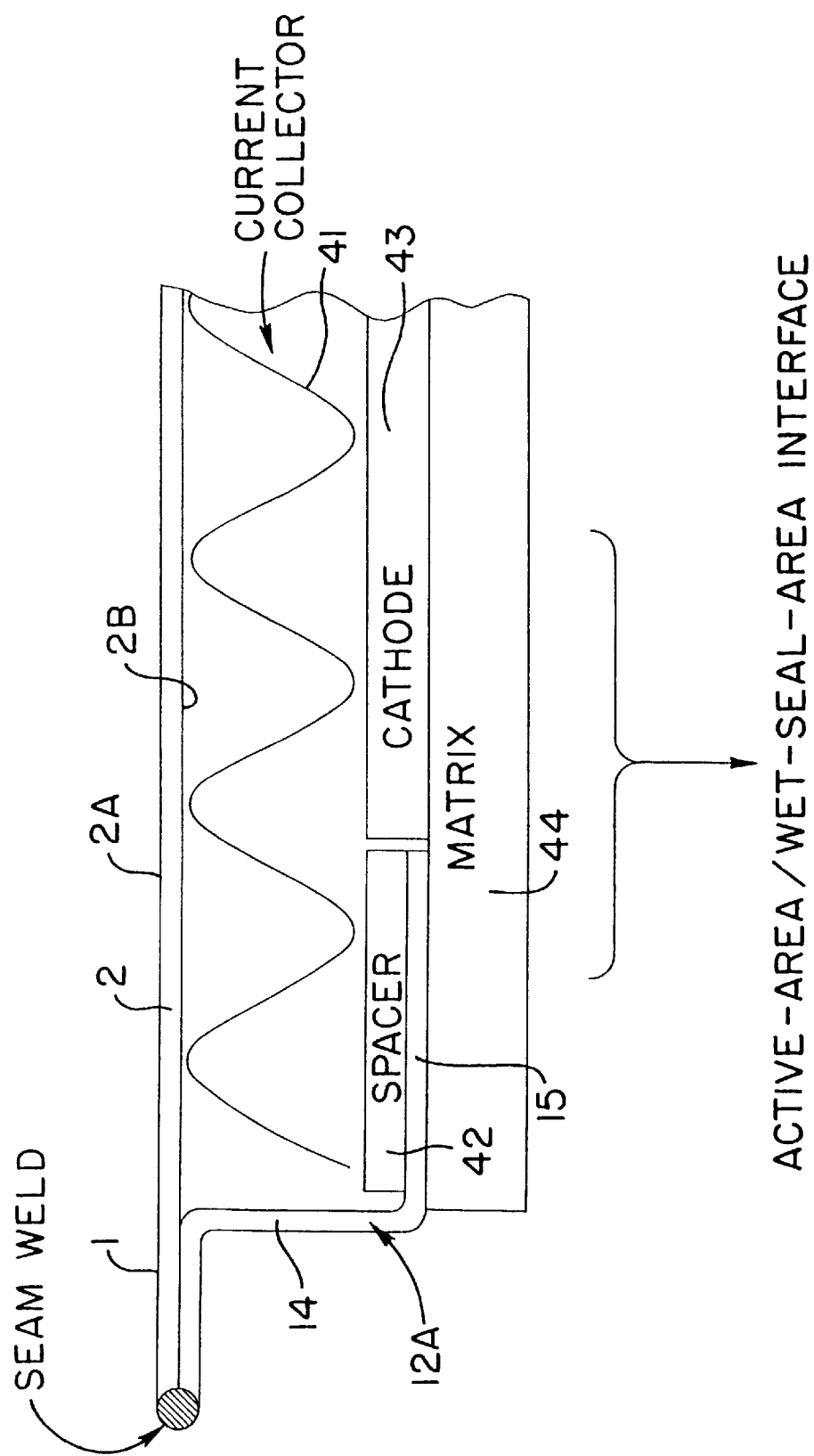
FIG. 4 illustrates a cross section taken through a portion of the bipolar separator of FIGS. 1–3 assembled with fuel cell components.

Moreover, due to the trough areas 4A, 4B and trough members 12A, 12B now being open opposite their first sides, there is no abrupt change over their extents which initially contact the respective fuel cell matrix. This is observable in the cross section of FIG. 4 which shows in partial view, a current collector 41, spacer 42, cathode electrode 43 and electrolyte matrix 44 of a fuel cell assembly integrated with the separator 1 as viewed from the side 3C of the central area 3 of the plate. As can be seen, at the active area/wet-seal-area interface, the trough member or rail 12A simply terminates and there is no vertical wall to create an abrupt change which would establish stress on the matrix.

Matrix stress relief is also provided at the extreme lateral ends of each trough area 4A, 4B and trough member 12A, 12B, by the lips and extensions 5A, 5B, 13A, 13B provided in the respective base wall of the area or member. These lips or extensions move the initial points of contact of the electrolyte matrix and the respective trough area or member forward of or away from the vertical walls created at the connection of the base wall and side walls. The stress on the matrix due to these vertical walls is thereby substantially reduced or eliminated. Accordingly, the separator 1 provides little or no stress on the electrolyte matrices supported on each trough area and each trough member.

The plate 2 and trough members 12A and 12B of FIGS. 1–3 can be made by a simple stamping or drawing operation, combined with, or followed by, a limited bending operation. Moreover, since all exposed surfaces of the rails are made of oxidant compatible material, the rails need not be further processed to achieve this.

Figure 5:
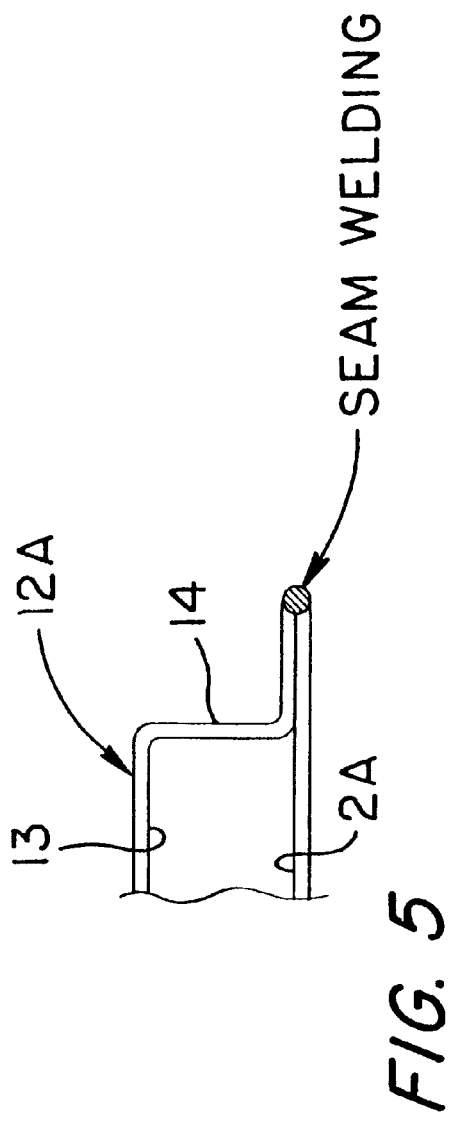
Figure 6:
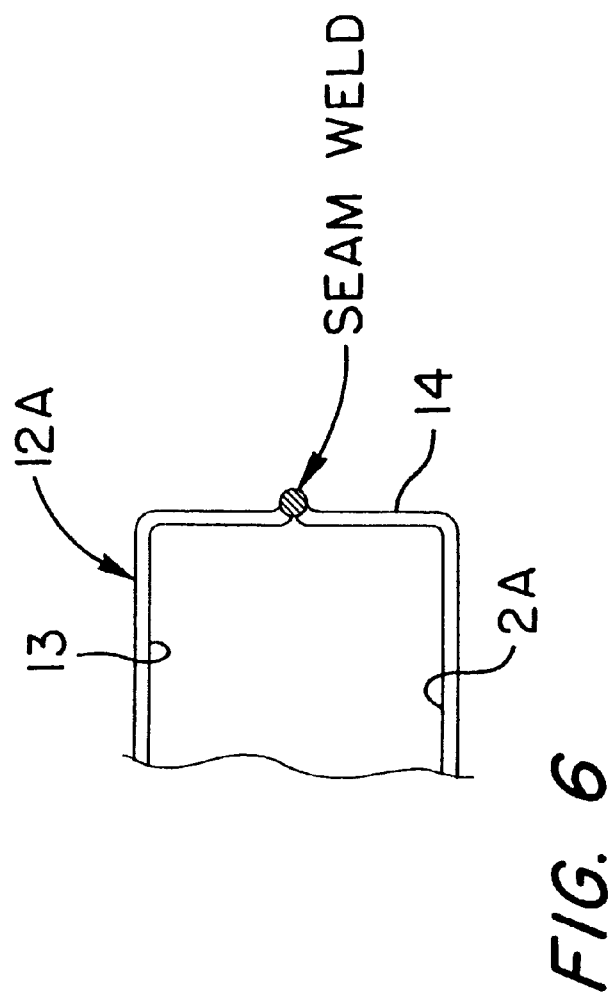

As indicated above, the trough members 12A, 12B can be secured to the surface of the plate 2 by seam welding. FIGS. 5 and 6 show two forms of such welding. In FIG. 5, the side 14 of the trough member is extended parallel to the plate and the plate and trough member are welded at their terminal ends. In FIG. 6, the plate end is bent and butted against the side of the trough member and the trough member and plate welded where they butt.

FIG. 7 shows a fuel cell unit 70 comprising upper and lower bipolar plates 1 as shown in FIGS. 1–3. The fuel cell unit further includes a cathode element 71 comprised of a cathode electrode 71A and a cathode current collector 71B having a surface abutting one surface of the cathode electrode. The cathode element 71 extends over the length and width of the central area 3 of the upper bipolar separator 1. In particular, the longitudinal ends of the element extend to the trough members 12A and 12B and the lateral ends extend to the sides 3A and 3B of the central area. Spacer elements 72 and 73 formed from spacer segments 72A, 73A and current collector segments 72B and 73B extend from respective ends of the cathode element 71 into the trough members 12B and 12A.

The height of the cathode element 71 is made equal to that of the trough members 12A and 12B. The element 71 and trough members thus form a flush surface for receiving an electrolyte matrix or tile 74 which abuts and extends over the entirety of this surface.

An anode element 75 formed of an anode electrode 75A and a corrugated anode current collector 75B follow the matrix element 74. One face of the anode electrode 75A abuts the matrix 74, while the other face abuts and supports one surface of the anode current collector 75B. The other surface of the anode current collector 75B rests on the central area 3 of the lower separator plate 1.

The anode element 75 extends laterally between the trough areas 4A and 4B of the lower separator plate 1 and longitudinally to the ends 3C and 3D of the central area 3 of this plate. Spacer elements 76 and 77 extend from the anode element 75 and fit into the latter trough areas. The spacer elements 76 and 77 include separator segments 76A and 77A and current collector segments 76B and 77B.

The anode element 75 sits on a flat surface formed by the central area 3. The anode electrode 75A of the anode element 75 provides a flat surface for seating the lower surface of the electrolyte matrix 74.

As can be appreciated, the trough members 12A and 12B of the upper separator plate 1 and the trough areas 4A and 4B of the lower separator plate 1 act as rails and the surfaces of these rails form wet seals with the matrix 74. These wet seals, in turn, keep the oxidant gas and fuel gas from leaking from the gas chambers formed by the cathode and anode elements and the separator plates, so as to prevent gas cross-over and gas escape from the fuel cell unit.

Moreover, the exposed surfaces of the rails are all formed of an oxidant compatible material, i.e., aluminized stainless steel, and, therefore, are highly resistant to oxidation and corrosion from the air in the environment.

While not shown, the trough members and trough areas can be further adapted as in the '286 application, to promote electrolyte management for the fuel cell unit. Thus, these elements can be adapted to permit either dispersing of electrolyte to or absorbing of electrolyte from the electrolyte matrix 74 of the unit. For example, through apertures can be provided in these elements as a means through which electrolyte can be wicked to or from the matrix 74.

In all cases it is understood that the abovedescribed arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A bipolar separator for use with a fuel cell which is supplied a fuel gas and an oxidant gas, the bipolar separator comprising:

a plate having opposing first and second surfaces which are compatible with a fuel gas and an oxidant gas, respectively, said plate further having a central area and opposing first and second trough areas formed into the first surface of the plate and extending from opposing first and second sides of said central area, said first and second trough areas each having a base wall and first, second and third side walls, the first side wall of each trough area connecting the trough area to the respective side of the central area and being at an angle relative to the central area, the second and third side walls of each trough area being connected to opposing sides of the first side wall and to opposing sides of the base wall of that trough area, each first and second trough area being open on the side opposite the first side wall of that trough area and being bent around so that the first surface of that trough area faces the first surface of the central area and the second surface of that trough area faces outwardly;

first and second trough members formed separately from said plate, each of said first and second trough members having first and second surfaces compatible with said oxidant gas and each further having a base wall and first, second and third side walls, the second and third side walls of each trough member being connected to opposing sides of the first side wall and to opposing sides of the base wall of that trough member, each first and second trough member being open on the side opposite the first side wall of that trough member;

said first and second trough members being secured to opposing third and fourth sides of said central area, respectively, such that the first side wall of each trough member connects that trough member to the respective side of the central area and it is at an angle relative to the central area and the first surface of the trough member faces the first surface of the central area and the second surface of the trough member faces outwardly.

2. A bipolar separator in accordance with claim 1 wherein:
the opposing sides of each base wall of each trough area and each trough member extend beyond the second and third side walls connected to that base wall.

3. A bipolar separator in accordance with claim 1 wherein:
the first and second trough members are secured to the third and fourth sides of said central area by welding.

4. A bipolar separator in accordance with claim 1 wherein:
said plate comprises a nickel aluminum clad such that said first surface is nickel and said second surface is stainless steel;
and said first and second trough members each comprise stainless steel.

5. A fuel cell assembly adapted to be supplied oxidant and fuel gases comprising:
at least a first bipolar separator, each bipolar separator including: a plate having opposing first and second surfaces which are compatible with a fuel gas and an oxidant gas, respectively, said plate further having a central area and opposing first and second trough areas formed into the first surface of the plate and extending from opposing first and second sides of said central area, said first and second trough areas each having a base wall and first, second and third side walls, the first side wall of each trough area connecting the trough area to the respective side of the central area and being at an angle relative to the central area, the second and third side walls of each trough area being connected to opposing sides of the first side wall and to opposing sides of the base wall of that trough area, each first and second trough area being open on the side opposite the first side wall of that trough area and being bent around so that the first surface of that trough area faces the first surface of the central area and the second surface of that trough area faces outwardly; first and second trough members formed separately from said plate, each of said first and second trough members having first and second surfaces compatible with said oxidant gas and each further having a base wall and first, second and third side walls, the second and third side walls of each trough member being connected to opposing sides of the first side wall and to opposing sides of the base wall of that trough member, each first and second trough member being open on the side opposite the first side wall of that trough member; said first and second trough members being secured to opposing third and fourth sides of said central area, respectively, such that the first side wall of each trough member connects that trough member to the respective side of the central area and it is at an angle relative to the central area and the first surface of the trough member faces the first surface of the central area and the second surface of the trough member faces outwardly;

an anode element extending to the ends of said first and second trough areas and between said first and second trough members of said first bipolar separator, said anode element facing said first surface of said plate of said first bipolar separator and defining therewith channels for receiving fuel gas for said anode element.

6. A fuel cell assembly in accordance with claim 5 further comprising:
an electrolyte element abutting said anode element and extending to the ends of said first and second trough areas of said plate of said first bipolar separator and to ends of said first and second trough members of said first bipolar separator; and
a cathode element abutting said electrolyte element, said cathode element extending between said first and second trough areas and to the third and fourth sides of the central area of said plate of said first bipolar separator.

7. A fuel cell assembly in accordance with claim 6 in which:
said first surface of said plate of said first bipolar separator comprises nickel;
said second surface of said plate of said bipolar separator comprises stainless steel;
and said trough members comprises stainless steel.

8. A fuel cell assembly in accordance with claim 6 wherein:
the opposing sides of each base wall of each trough area and each trough member extend beyond the second and third side walls connected to that base wall.

9. A fuel cell assembly in accordance with claim 6 wherein:
the first and second trough members are secured to the third and fourth sides of said central area by welding.

* * * * *

UNITED STATES PATENT AND TRADEMARK OFFICE
CERTIFICATE OF CORRECTION

PATENT NO. : 6,159,627
DATED : December 12, 2000
INVENTOR(S) : Chao-Yi Yuh et al.

It is certified that error appears in the above-identified patent and that said Letters Patent is hereby corrected as shown below:

<u>Column 4,</u>
Line 54, delete "abovedescribed" and insert -- above-described --.

Signed and Sealed this

First Day of January, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,159,627  
DATED : December 12, 2000  
INVENTOR(S) : Chao-Yi Yuh et al.

Page 1 of 1

It is certified that error appears in the above-identified patent and that said Letters Patent is hereby corrected as shown below:

Column 1,  
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Thirtieth Day of May, 2006

JON W. DUDAS
*Director of the United States Patent and Trademark Office*